United States Patent
VanBlon et al.

(10) Patent No.: US 9,633,083 B2
(45) Date of Patent: Apr. 25, 2017

(54) ORGANIZING SEARCH RESULTS USING SMART TAG INFERENCES

(71) Applicant: Lenovo (Singapore) Pte. Ltd., Singapore (SG)

(72) Inventors: Russell Speight VanBlon, Raleigh, NC (US); Rod D. Waltermann, Rougemont, NC (US); Suzanne Marion Beaumont, Wake Forest, NC (US); Jonathan Gaither Knox, Morrisville, NC (US); Peter Hamilton Wetsel, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 222 days.

(21) Appl. No.: 14/097,987

(22) Filed: Dec. 5, 2013

(65) Prior Publication Data

US 2015/0161132 A1    Jun. 11, 2015

(51) Int. Cl.
*G06F 17/30*    (2006.01)

(52) U.S. Cl.
CPC .... *G06F 17/3053* (2013.01); *G06F 17/30038* (2013.01); *G06F 17/30268* (2013.01); *G06F 17/30876* (2013.01); *G06F 17/30997* (2013.01)

(58) Field of Classification Search
CPC .......... G06F 17/3053; G06F 17/30038; G06F 17/301; G06F 17/3012; G06F 17/30817; G06F 17/30997; G06Q 50/01; H04L 67/22
USPC ........................................ 707/737, 748, 728
See application file for complete search history.

(56) References Cited

U.S. PATENT DOCUMENTS

| | | | | |
|---|---|---|---|---|
| 8,200,669 | B1* | 6/2012 | Iampietro | G06F 17/30784 707/737 |
| 8,566,329 | B1* | 10/2013 | Freed | G06F 17/3053 707/748 |
| 2005/0071328 | A1* | 3/2005 | Lawrence | G06F 17/30867 |
| 2007/0078832 | A1* | 4/2007 | Ott | G06F 17/30867 |
| 2007/0185858 | A1* | 8/2007 | Lu | G06F 17/30864 |
| 2008/0005068 | A1* | 1/2008 | Dumais | G06F 17/30528 |
| 2008/0016098 | A1* | 1/2008 | Frieden | G06F 17/30864 |
| 2008/0114644 | A1* | 5/2008 | Frank | G06Q 30/02 705/14.73 |
| 2008/0172363 | A1* | 7/2008 | Wang | G06F 17/3089 |
| 2010/0005106 | A1* | 1/2010 | Carter | G06F 17/30867 707/E17.112 |
| 2010/0229082 | A1* | 9/2010 | Karmarkar | H04M 1/72547 715/205 |
| 2012/0023103 | A1* | 1/2012 | Soderberg | G06F 17/30265 707/739 |
| 2012/0084277 | A1* | 4/2012 | Barve | G06F 17/30864 707/708 |
| 2012/0265806 | A1* | 10/2012 | Blanchflower | G06Q 10/10 709/204 |

(Continued)

*Primary Examiner* — Dennis Truong
(74) *Attorney, Agent, or Firm* — Ference & Associates LLC (57) ABSTRACT

An aspect provides a method, including: accessing a tagging profile based on a store of historical user object information; determining, using the processor, a current user object search has been made by a user; determining, using the processor, a priority smart tag for providing results for the current user object search based on the tagging profile; and providing the results of the current user object search according to the priority tag determined. Other aspects are described and claimed.

16 Claims, 3 Drawing Sheets

(56) References Cited

U.S. PATENT DOCUMENTS

| | | | |
|---|---|---|---|
| 2012/0320248 A1* | 12/2012 | Igarashi | G01C 21/32 348/333.01 |
| 2013/0262588 A1* | 10/2013 | Barak | H04L 67/22 709/204 |
| 2014/0136549 A1* | 5/2014 | Surya | G06F 17/3053 707/749 |
| 2014/0372455 A1 | 12/2014 | Locker et al. | |
| 2014/0372467 A1 | 12/2014 | Locker et al. | |
| 2015/0120719 A1* | 4/2015 | Aarabi | G06F 17/3084 707/728 |

\* cited by examiner

ORGANIZING SEARCH RESULTS USING SMART TAG INFERENCES

BACKGROUND

Information handling devices ("devices") come in a variety of forms, for example laptop computing devices, tablet computing devices, smart phones, e-readers, MP3 players, and the like. Such devices are configured for media consumption and users typically store "files", e.g., music, videos, pictures, documents, etc. (hereinafter simply "objects") on the devices.

For example, a typical device user may have thousands and thousands of objects (files, pictures, content, etc.) scattered across his or her device. To compound this, with the advent of cloud computing and remote storage, a user may have objects scattered across many devices (e.g., laptop, tablet, smart phone, work station, etc.) and in cloud storage device(s). The user might remember some things about an object he or she wishes to retrieve, but the user nevertheless often may find it difficult to find it quickly. For example, many devices create media file names that are less than helpful (e.g., a number corresponding to a digital image captured by a smart phone and stored on the smart phone locally and in a cloud or other network connected device). Even if the user has chosen a memorable file name or storage folder, object retrieval can prove challenging in the current use environment where typically the objects are scattered throughout the device and/or devices and not well organized from a retrieval standpoint.

BRIEF SUMMARY

In summary, one aspect provides a method, comprising: accessing a tagging profile based on a store of historical user object information; determining, using the processor, a current user object search has been made by a user; determining, using the processor, a priority smart tag for providing results for the current user object search based on the tagging profile; and providing the results of the current user object search according to the priority tag determined.

Another aspect provides an information handling device, comprising: a processor; a memory device that stores instructions accessible to the processor, the instructions being executable by the processor to: access a tagging profile based on a store of historical user object information; determine, using the processor, a current user object search has been made by a user; determine, using the processor, a priority smart tag for providing results for the current user object search based on the tagging profile; and provide the results of the current user object search according to the priority tag determined.

A further aspect provides a product, comprising: a storage device having code stored therewith, the code comprising: code that accesses a tagging profile based on a store of historical user object information; code that determines, using the processor, a current user object search has been made by a user; code that determines, using the processor, a priority smart tag for providing results for the current user object search based on the tagging profile; and code that provides the results of the current user object search according to the priority tag determined.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As described in further detail herein, a user is often faced with a serious challenge when attempting to find an object he or she wants, and it is often doubly challenging to find the object quickly. Such a user would benefit greatly from a retrieval mechanism that operates on the principle of tagging objects with data regarding "some thing(s) you will remember a year or more later".

Today users are limited in their object retrieval choices. For instance, users are basically limited to only searching by file name and/or date that file was modified, and/or information inside the file for some type of files (e.g., words contained within a Microsoft WORD document). Unfortunately, from a usability stand point, this is either entirely ineffective (e.g., file name on a video file is a machine generated number) or simply frustrating, as this is not the way our minds work to remember clues about the object (and that are not necessarily in the object), especially if it is a non-data object (picture, video, etc.).

Accordingly, an embodiment provides the ability to use smart tags for retrieval of user generated objects (e.g., pictures, documents, files, etc.) that are stored on the user's device(s). Some useful information regarding smart tags is found in co-pending and commonly assigned U.S. patent application Ser. No. 13/919,293, entitled "SMART TAGS FOR CONTENT RETRIEVAL", filed on Jun. 17, 2013 and in co-pending and commonly assigned U.S. patent application Ser. No. 13/919,376, entitled "CONTEXTUAL SMART TAGS FOR CONTENT RETRIEVAL", filed on Jun. 17, 2013; the contents of each of these prior applications are incorporated by reference in their entirety herein.

An embodiment permits, for example, generation of a smart tag describing an object (e.g., a picture file, a document, etc.) created by a user and stored on one of the user's devices. Thus, a user creating a picture file by taking a picture may have a smart tag created and associated therewith and stored in a tag collection, e.g., on the user device and/or in a remote or cloud storage device. The tag may contain metadata, e.g., user provided metadata such as audio for generating key words describing the picture file, and/or system originated data, e.g., from one or more sensors, such as global positioning data regarding the location the picture was taken, data indicating an association of such position with nearby businesses or landmarks as for example available in map data, sensed user devices in the location of the user device utilized to take the picture, e.g., smart phones of friends or family members in the vicinity, etc., data from sensors or other information repositories regarding the environment, e.g., temperature, weather events, ambient light, timing data, etc.

Given the ability to generate such smart tags, a user may be assisted in a search for an object via leveraging the smart tag data in the search. For example, if a user happens to be taking pictures of a friend at a particular occasion, e.g., Bob's 50th birthday party, the user could simply say "Bob's 50th birthday party" to provide speech input for creating a smart tag for the object to be created, i.e., the picture. This information is then processed (e.g., converted using a speech-to-text mechanism) and stored as a separate tag or tags with a link/naming convention linking it to the object (picture). The user may then later retrieve the object, i.e., the picture in this example, simply by inputting a search such as "the picture I took at the birthday party last week" and searching the smart tags for this object.

Smart tags may be generated for the entire content universe of a user (e.g., creating smart tag(s) including all key words contained within a word processing document, for all such word processing documents of the user, as well as smart tags regarding location of document creation, modification, and other contextually based smart tags, etc.). While these numerous smart tags offer a rich data background that may be used to located the user's object(s), the utilization of such smart tags should be intelligently employed such that object search results provided to a user take on a useful form rather than generating a large list of user objects having smart tags matched to the query.

Accordingly, an embodiment provides for the use of a tagging profile in organizing, e.g., ranking, the results of a user object query. An embodiment for example generates smart tag based inferences using the tagging profile to rank search results according to what a user is likely to be interested in. User specific inferences and/or group specific inferences may be utilized.

The illustrated example embodiments will be best understood by reference to the figures. The following description is intended only by way of example, and simply illustrates certain example embodiments.

Figure 1:
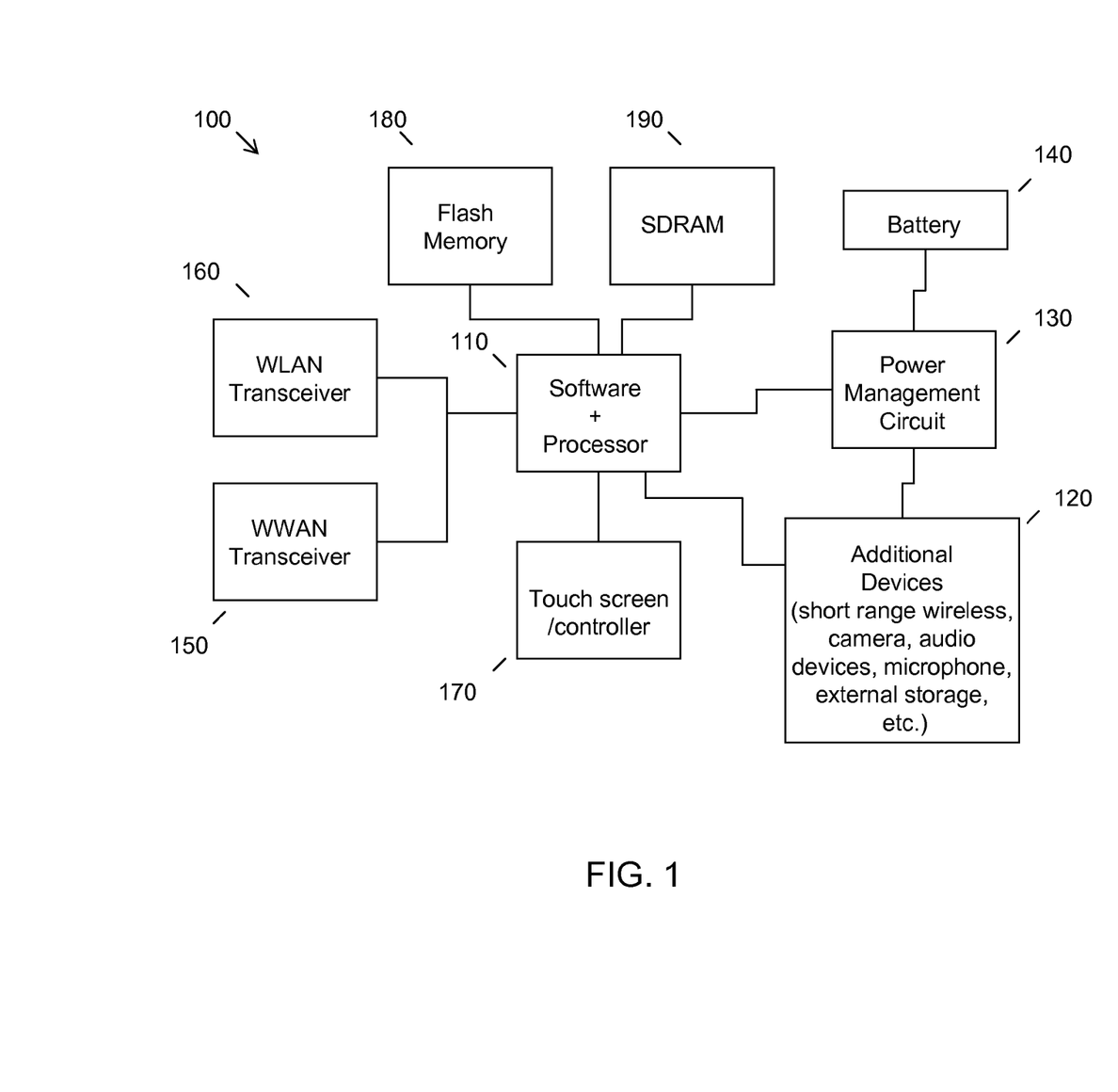
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included. System 100 often includes a touch screen 170 for data input and display/rendering. System 100 also typically includes various memory devices, for example flash memory 180 and SDRAM 190.

Figure 2:
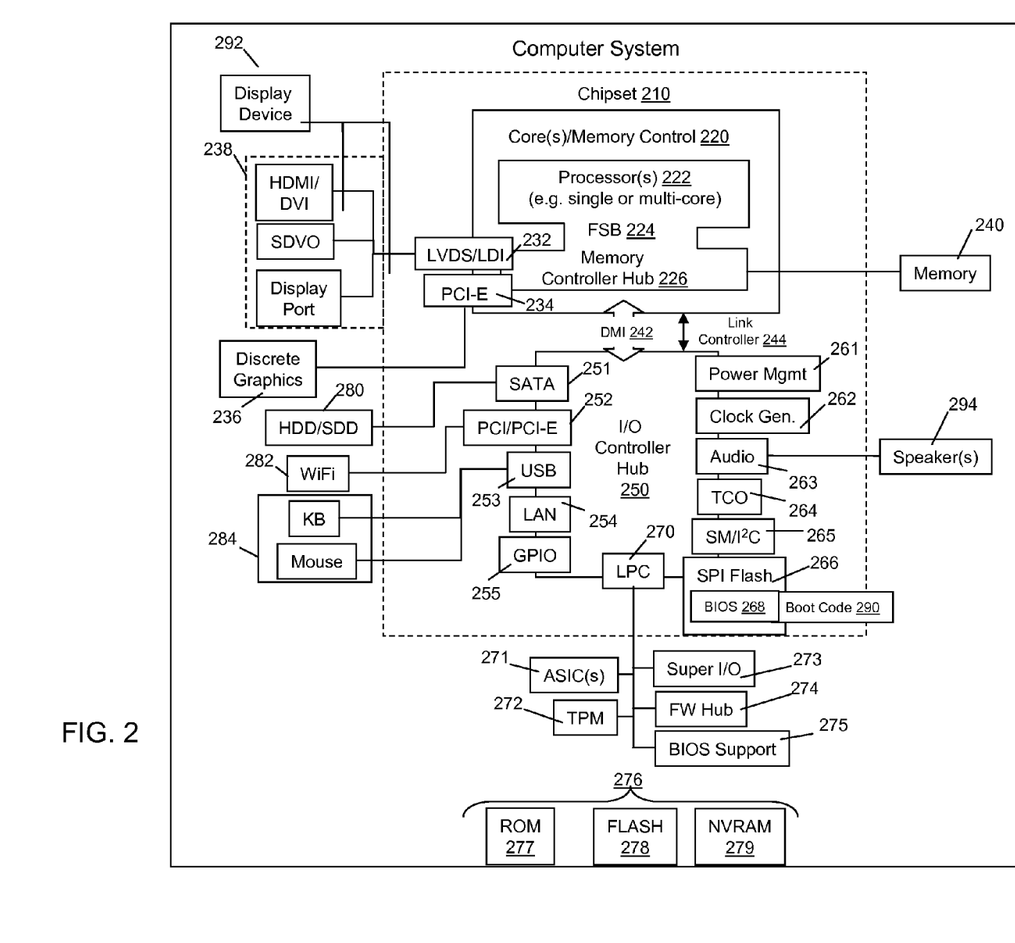
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be user devices that are used to create and/or store objects, e.g., data or files created by the user. For example, devices including circuitry outlined in the example of FIG. 1 may include a smart phone with which a user takes pictures, takes videos, purchases and downloads music files, sends emails, texts, etc. Each of these data objects or files (simply referred to herein as "objects" or "user objects") may be stored by the user, e.g., on the device, in the cloud, on multiple user devices, etc.

As outlined above, a user will often face a significant challenge when he or she later attempts to find a particular object of interest. This challenge comes from the sheer volume of objects which may be created or generated and stored by the user. An embodiment facilitates user object searches via employing context data available in smart tags in an intelligent fashion such that user or group specific inferences may be utilized in organizing the search results.

For example, a user may wish to find a file that he or she worked on last week. This may include hundreds of such documents (e.g., word processing documents). Furthermore, if the user is defined as a group of users (e.g., working group, company division, social club, etc.), the list of documents worked on within the last week, month, etc. may grow exponentially.

Embodiments provide for smart tags to be created, thus simplifying the searching and location of such objects, e.g., using parameters or characteristics of interest to the user and thus easily remember. For example, the user may recall that he or she not only worked on a document last week, but also that he or she worked on that document at a coffee shop and that was a day it snowed. These additional parameters or characteristics regarding object context are captured in the smart tags and may be leveraged for object retrieval.

Figure 3:
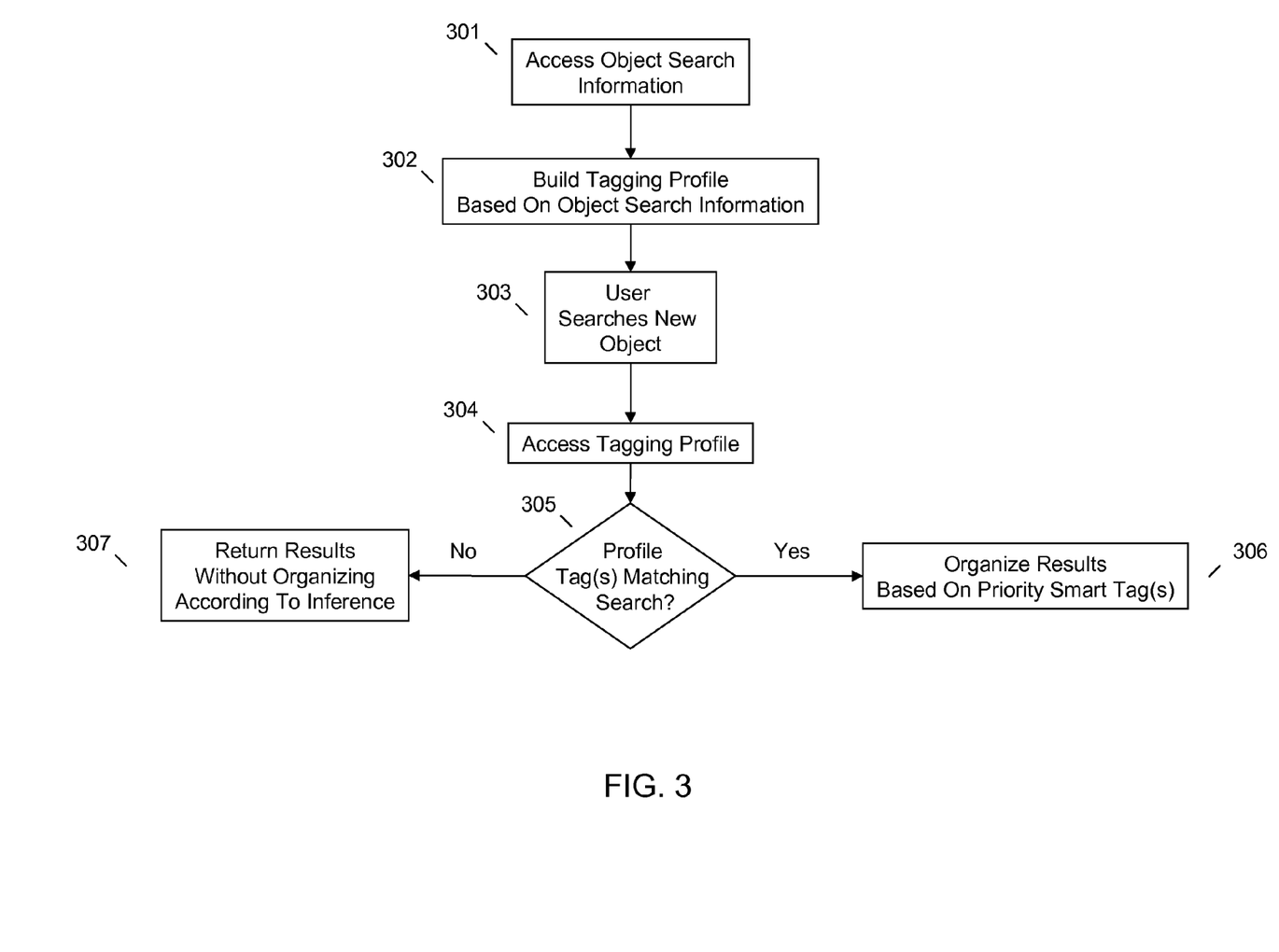
FIG. 3 illustrates an example method of organizing search results using smart tag inferences.

Given the large amount of such context data that may be generated and used in forming the smart tags, referring to FIG. 3, an embodiment may leverage information within a tagging profile to infer which context data represented by the smart tags may be most relevant for a particular search. The tagging profile may be generated, e.g., in the cloud or at the user device, or a previously built tagging profile may be accessed by the user's device as needed. Additionally, a user data derived profile may be accessed and/or a default or group-specific profile may be accessed. Moreover, combinations of profiles may be accessed, as is further described herein.

In an embodiment that builds a user profile, at an appropriate time, e.g., when a user creates an object or prior to object creation (e.g., as a background task related to previously created objects), an embodiment may access object search information at 301. This object search information may include historical object searching information of a particular user, a group of users, etc. The object search information may be stored on the user's device, partly on the user's device and partly on another device, or entirely on another device, e.g., a cloud based storage location.

In any event, an embodiment may utilize the object search information to form or build a tagging profile at 302. That is, an embodiment may detect various characteristics captured in or represented by the object search information to profile a particular user, a particular group of users, etc. This information may therefore be utilized to build a tagging profile at 302.

For example, an embodiment may analyze a user's query history and/or the user's feedback about the results of queries to extract data useful in forming the tagging profile at 302. By way of example, the tagging profile may include the types of content that the user was previously interested in, as indicated in the object search information, e.g., word processing documents, calendar entries, etc. The tagging profile may include a list of tag categories that are relevant to the user, e.g., as indicated by the past usage thereof in completing searches for this particular user, e.g., environmental conditions during object creation/modification, etc. The tagging profile may include a set of tags that have been relevant in the past to the user, e.g., specific tags used by the user.

With a tagging profile available, when the user next searches for a user object at 303, e.g., word processing document, email, picture file, etc., the tagging profile may be accessed at 304 to infer smart tag(s) that may be of interest to the user. For example, a tagging profile accessed at 304 may indicate one or more priority smart tags, e.g., a smart tag or smart tag category frequently used by this particular user. Examples of smart tags or smart tag categories frequently used may include but are not limited to file type smart tags (e.g., smart tags for picture files, video files, word processing documents, etc.), time or location smart tags, sensor derived smart tags, e.g., indicative of temperature, weather, location, etc.

If one or more priority smart tags, e.g., smart tags and/or smart tag categories frequently used by this particular user, have been determined for the user, as indicated in the user's tagging profile, an embodiment determines if the user's current search for a new object invokes or is associated with one or more of these priority smart tags/smart tag categories at 305. If there is a match between the profile smart tag information and the tags associated with the current search, an embodiment may infer that results having smart tags matching the high priority smart tags/smart tag categories are more relevant to the user than results that, while having smart tags matched to the search or sub-parts thereof, do not also match the high priority smart tags indicated in the tagging profile.

As described herein, an embodiment may generate user specific inferences and/or group specific inferences, e.g., based on the tagging profile(s) accessed at 304. Thus, based on a user's previous choices, e.g., smart tag/smart tag category preferences indicated in the tagging profile, smart tag correlations are created for the user to intelligently organize the search results.

For example, the user's previous choices may be used in filtering or prioritizing results. Results may be further subdivided by categories that make sense to a user based on information indicated in the tagging profile. For example, a user may be presented results that are organized and separately ranked by various categories indicated as popular for the user in the tagging profile. As a specific example, the tagging profile may indicate two priority smart tag categories for a particular user, e.g., files the user works on for personal life and files the user works on at work. The results may thus be bifurcated into two groups, i.e., those objects having a work smart tag and those objects having a personal smart tag, with each results list ranked separately. An embodiment may optionally present the user with an opportunity to control the implementation and use of a tagging profile, e.g., presenting organized results as a suggestion for organizing the results, asking the user to opt-in for use of a tagging profile, asking the user for an indication of a particular tagging profile for use, etc.

The matching or associating of priority tags within the profile with tags invoked by the search may be strengthened in a variety of ways. For example, terms of the input user search may be extracted and utilized to narrow down or refine the list of results based on what the user did with the file. In this regard, for example, if the search made by the user was "find the file I looked at last week", an embodiment may distinguish this from (and therefore match different smart tags from the tagging profile) a search of "find the file I worked on last week".

In this specific example, an embodiment may distinguish between smart tags associated with modification (e.g., associated with the search term "worked" or the search terms "worked on") from smart tags associated with accessing (e.g., associated with the search term "looked" or the search terms "looked at"). Thus, if the tagging profile contains priority tags for both modified files and accessed files, only the accessed files smart tag may be determined to be a high priority smart tag invoked by the search at 305.

Similarly, the priority level may be refined by an embodiment rather than simply having a priority/low priority determination. For example, smart tags/smart tag categories, such as time of day or location, may be used to determine or infer a priority level for the particular smart tags and thus infer or determine what the user is interested in with respect to a given search and its characteristics. Thus, by way of example, if a user typically edits video files at 1:00 p.m. or at a certain location, and searches for video files at the particular time or location, video files having smart tags of this time and/or location might have a higher priority in this context, even though a "video file" smart tag category is listed as high priority smart tag in the user's tagging profile. Therefore, for a search query made at that time and/or location the, such information may be utilized in determining which smart tags included in the user's profile are higher in priority or highest in priority for a search made in that given context. Other smart tags may be used in this regard, depending on which data is determined to be contextually relevant, e.g., device type, ambient lighting level, weather conditions, etc.

It is worth noting that a user may utilize a group specific tagging profile, e.g., via accessing a group specific tagging profile via a cloud account. This may be appropriate in a variety of situations, e.g., the user is new and thus not much data is available to build a user specific tagging profile, a user is known to belong to a particular group, etc. A group inference therefore may be generated by an embodiment, e.g., automatically, if previous choices of the user match what is typical for a particular group such that a group tagging profile may be selected for the user. The system may for example determine if user specific tagging profiles (and inferences drawn therefrom) or group specific tagging profiles (and inferences drawn therefrom) are most appropriate for a given user search and/or may ask the user which is most appropriate, desired, etc.

Similarly, when viewing search results, the user may choose to view individual results or group/population results. That is, an embodiment may conduct the search using two or more tagging profiles (e.g., a user specific tagging profile, a group specific tagging profile, etc.) to generate more than one version of results. For example, if the query is "find the document I worked on last week", group results may include document types that are popular to that group of people whereas individual results may include document types that are popular only to that specific user issuing the query. Results may be presented to the user in a variety of ways. For example, an embodiment may allow a user to select an appropriate list of results and/or group and individual/user specific results may each be combined in an organized results presentation.

An embodiment therefore facilitates utilization of tagging profiles to infer which results may be most relevant to a particular user. This allows for intelligent handling of a large number of potentially relevant smart tags such that high priority tags and the objects associated therewith will be promoted or higher ranked in object results provided to the user.

It should be noted that the various functions described herein may be implemented using instructions stored on a device readable storage medium such as a non-signal storage device that are executed by a processor. Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., nearfield communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    accessing, using first user device, a tagging profile based on a store of historical user object information, wherein the tagging profile includes priority tag data for a particular user;
    determining, using a processor of the first user device, a user object search has been made by the particular user, wherein the user object search is directed to finding an object generated by the first user device;
    determining, using the processor, a priority smart tag used for organizing results from the user object search, wherein the priority smart tag corresponds to a tag or tag category frequently used by the particular user in object searching, indicated by the priority tag data;
    searching, using the first device, user objects having one or more tags associated therewith;
    determining, using a processor of the first device, that a tag of a user object is associated with the priority smart tag; and
    providing the results of the user object search, wherein the results are ordered to promote the user object having the tag associated with the priority smart tag.

2. The method of claim 1, wherein providing the results of the user object search comprises organizing the results based on an organization selected from the group of organizations consisting of:
    ranking results of the user object search based on the priority smart tag;
    grouping results based on the priority smart tag; and
    limiting results to object storage locations associated with the priority smart tag.

3. The method of claim 1, wherein the tagging profile is group specific.

4. The method of claim 3, wherein the tagging profile indicates priority smart tag categories frequently used by a group.

5. The method of claim 4, wherein the group is associated with a user making the user object search via cloud account data.

6. The method of claim 1, wherein the priority smart tag is associated with a user object file type.

7. The method of claim 1, wherein a user object is an object resident on one or more devices associated with the user.

8. The method of claim 1, wherein the tagging profile includes system tags automatically generated by the first user device operating a sensor and automatically associating the tags with user objects at time of object generation, wherein the tags comprise geographic location data.

9. The method of claim 1, wherein the tagging profile includes system tags automatically generated by the first user device operating a sensor and automatically associating the tags with user objects at time of object generation, wherein the tags comprise weather data.

10. An information handling device, comprising:
    a processor;
    a memory device that stores instructions accessible to the processor, the instructions being executable by the processor to:
    access a tagging profile based on a store of historical user object information, wherein the tagging profile includes priority tag data for a particular user;
    determine, using the processor, a user object search has been made by the particular user, wherein the user object search is directed to finding an object generated by the information handling device;
    determine, using the processor, a priority smart tag used for organizing results from the user object search, wherein the priority smart tag corresponds to a tag or tag category frequently used by the particular user in object searching, indicated by the priority tag data;
    search user objects having one or more tags associated therewith;
    determine that a tag of a user object is associated with the priority smart tag; and
    provide the results of the user object search, wherein the results are ordered to promote the user object having the tag associated with the priority smart tag.

11. The information handling device of claim 10, wherein to provide the results comprises organizing the results based on an organization selected from the group of organizations consisting of:
    ranking results of the user object search based on the priority smart tag;
    grouping results based on the priority smart tag; and
    limiting results to object storage locations associated with the priority smart tag.

12. The information handling device of claim 10, wherein the tagging profile is group specific.

13. The information handling device of claim 12, wherein the tagging profile indicates priority smart tag categories frequently used by a group.

14. The information handling device of claim 13, wherein the group is associated with a user making the user object search via cloud account data.

15. The information handling device of claim 10, wherein the priority smart tag is associated with a user object file type.

16. A product, comprising:
a storage device having code stored therewith, the code being executable by a processor and comprising:
code that accesses, using first user device, a tagging profile based on a store of historical user object information, wherein the tagging profile includes priority tag data for a particular user;
code that determines, using a processor of the first user device, a user object search has been made by the particular user, wherein the user object search is directed to finding an object generated by the first user device;
code that determines, using the processor, a priority smart tag used for organizing results from the user object search, wherein the priority smart tag corresponds to a tag or tag category frequently used by the particular user in object searching, indicated by the priority tag data;
code that searches, using the first device. user objects having one or more tags associated therewith;
code that determines, using a processor of the first device, that a tag of a user object is associated with the priority smart tag: and
code that provides the results of the user object search, wherein the results are ordered to promote the user object having the tag associated with the priority smart tag.

* * * * *